US009225136B2

(12) United States Patent
Angelov et al.

(10) Patent No.: US 9,225,136 B2
(45) Date of Patent: Dec. 29, 2015

(54) WIRE SEPARATING METHOD AND SYSTEM

(71) Applicant: Tyco Electronics Corporation, Berwyn, PA (US)

(72) Inventors: Aleksandar Kolev Angelov, Harrisburg, PA (US); Jason Thomas Chiota, Harrisburg, PA (US); Bicheng Chen, Harrisburg, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 392 days.

(21) Appl. No.: 13/660,745

(22) Filed: Oct. 25, 2012

(65) Prior Publication Data

US 2014/0115855 A1 May 1, 2014

(51) Int. Cl.
*H02G 1/00* (2006.01)
*H01R 43/28* (2006.01)

(52) U.S. Cl.
CPC ........... *H01R 43/28* (2013.01); *Y10T 29/49764* (2015.01); *Y10T 29/49805* (2015.01); *Y10T 29/49822* (2015.01); *Y10T 29/53091* (2015.01); *Y10T 29/53274* (2015.01)

(58) Field of Classification Search
CPC .............. H01R 43/28; Y10T 29/53278; Y10T 29/49822; Y10T 29/49764; Y10T 29/49805; Y10T 29/49755; Y10T 29/4978; Y10T 29/53078; Y10T 29/53091; E04F 21/14
See application file for complete search history.

(56) References Cited

FOREIGN PATENT DOCUMENTS

| | | | |
|---|---|---|---|
| EP | 0 748 019 | A1 | 12/1996 |
| EP | 1 355 389 | A2 | 10/2003 |

OTHER PUBLICATIONS

International Search Report, International Application No. PCT/US2013/066322, International Filing Date, Oct. 23, 2013.

*Primary Examiner* — John C Hong

(57) ABSTRACT

A method of separating wires from a wire bundle includes positioning a cable with a wire bundle at a wire separating area, positioning a gas nozzle at the wire separating area, and directing gas flow at the wire bundle to separate the wires from the wire bundle. A wire separating system is used to separate wires and including a cable holder having a fixture holding a cable with a wire bundle extending into a wire separating area. The system includes a gas nozzle at the wire separating area that directs gas flow into the wire separating area at the wire bundle. The gas flow separates individual wires from the wire bundle. A wire gripper is provided at the wire separating area. The wire gripper grasps the separated wire from the wire bundle.

20 Claims, 3 Drawing Sheets

WIRE SEPARATING METHOD AND SYSTEM

BACKGROUND OF THE INVENTION

The subject matter herein relates generally to wire separating methods and systems.

Many electrical components are mounted to ends of cables. The cables have individual wires that are terminated to the various components of the electrical component. For example, the wires may be soldered to circuit boards or terminated to contacts or terminals. Assembly of the electrical components and connection of the electrical components to the cables is time consuming. Typically, the wires are separated manually from the bundle of wires, such as by an operator manually manipulating each wire individually, and placing the wire in position for terminating to the circuit board or contacts. Such manual separating of the wires is time consuming.

There is a need for a cost effective automated process of separating wires of a cable without human operator intervention.

BRIEF DESCRIPTION OF THE INVENTION

In one embodiment, a method of separating wires from a wire bundle is provided including positioning a cable with a wire bundle at a wire separating area, positioning a gas nozzle at the wire separating area, and directing gas flow at the wire bundle to separate the wires from the wire bundle.

Optionally, the method may include controlling a pressure of the gas flow or the velocity at the impinging point to separate specific wires from the wire bundle, wherein at lower pressures smaller wires in the wire bundle are separated from larger wires in the wire bundle. Directing the gas flow may cause the wires to bend away from the gas nozzle.

The method may include grasping the separated wire with a wire gripper and processing the grasped wire. The method may include identifying the wires with a sensor. The method may include holding the cable with a fixture upstream of the wire separating area. The method may include positioning a second gas nozzle at the wire separating area and controlling gas flow from both gas nozzles.

The method may include positioning a cable with wires of different stiffness in the wire separating area. The gas flow may be varied to initially separate the wire of less stiffness from the wire of greater stiffness.

In another embodiment, a wire separating system is provided including a cable holder having a fixture holding a cable with a wire bundle extending into a wire separating area. The system includes a gas nozzle at the wire separating area that directs gas flow into the wire separating area at the wire bundle. The gas flow separates individual wires from the wire bundle. A wire gripper is provided at the wire separating area. The wire gripper grasps the separated wire from the wire bundle.

Optionally, the gas nozzle may vary a pressure of the gas flow or the velocity at the impinging point. The wire bundle may include wires of different stiffness and the pressure of the gas flow may be varied to initially separate the wire of less stiffness from the wire of greater stiffness. The wire gripper may move the grasped wire from the wire separating area.

Optionally, the system may include a sensor configured to identify the separated wire. The system may include a sensor configured to identify the wires based on wire attributes such as color, size, stiffness and the like. The system may include a second gas nozzle directing gas flow into the wire separating area in a direction different than the other gas flow. The relative position of the gas nozzle with respect to the wire bundle may be changed to change the direction of the gas flow relative to the wire bundle.

DETAILED DESCRIPTION OF THE INVENTION

Figure 1:
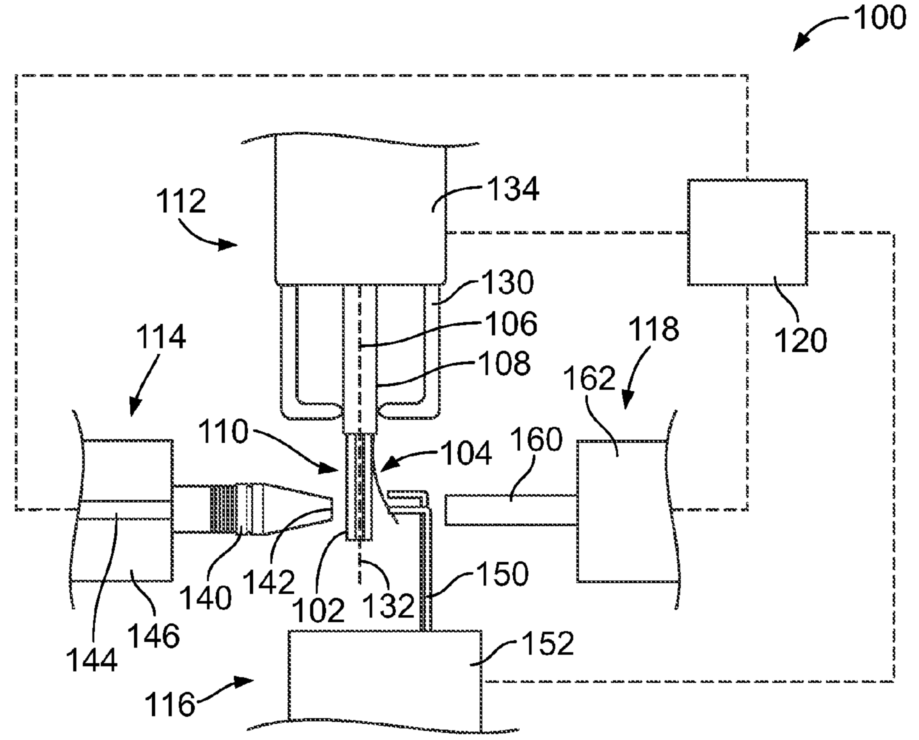
FIG. 1 illustrates a wire separating machine formed in accordance with an exemplary embodiment.

FIG. 1 illustrates a wire separating machine 100 formed in accordance with an exemplary embodiment. The wire separating machine 100 is used to separate individual wires 102 from a wire bundle 104 of a cable 106. The wire separating machine 100 automatically separates the wires 102 as part of an automated process without human intervention. The wire bundle 104 is exposed by removing a portion of a jacket 108 of the cable 106. The wire bundle 104 is presented at a wire separating area 110 of the wire separating machine 100. The wires 102 may be individually separated from the other wires 102 and may be positioned at a predetermined location relative to the other wires 102 for further processing, such as for terminating the wires 102 to an electrical component, such as a circuit board.

The wire separating machine 100 includes a cable holder module 112, a gas nozzle module 114, a wire gripper module 116 and a sensor module 118. The cable holder module 112 holds the cable 106 with the wire bundle 104 at the wire separating area 110. The gas nozzle module 114 directs gas flow toward the wire bundle 104 to displace or separate the individual wires 102 from the wire bundle 104. The wire gripper module 116 grips the displaced or separated wire 102 and may move the wire 102 to a predetermined location. The sensor module 118 senses the location of the wire 102. The sensor module 118 may identify the particular wire 102, such as to control operation of the gas nozzle module 114 and/or wire gripper module 116. The wire separating machine 100 includes a controller 120 coupled to the modules 112, 114, 116, 118. The controller 120 controls operation of the modules 112, 114, 116, 118.

The cable holder module 112 includes a fixture 130 used to hold the cable 106 proximate to the end of the cable 106. In the illustrated embodiment, the fixture 130 includes clamps or fingers that hold the cable 106 proximate to the end of the jacket 108 near the wire bundle 104. The fixture 130 holds the cable 106 upstream of the wire separating area 110. In an exemplary embodiment, the fixture 130 holds the cable 106 such that the wires 102 and wire bundle 104 extend along a cable axis 132. In the illustrated embodiment, the cable 106 is oriented generally vertically, with the wire bundle 104 extending downward. Other orientations are possible in alternative embodiments.

The cable holder module 112 includes a holder positioner 134 that positions the fixture 130 and the cable 106 relative to the other components of the wire separating machine 100. Optionally, the holder positioner 134 is movable in three dimensions to move the cable 106 to a desired location, such as at the wire separating area 110. The holder positioner 134 may allow rotational movement of the fixture 130, such as about the cable axis 132. The holder positioner 134 may be a Cartesian motion robot with a rotary axis. Other types of positioners may be used in other embodiments, such as a selective compliance assembly robot arm (SCARA) or other robotic motion system. Optionally, the holder positioner 134 may allow translational movement, angular movement and rotational movement.

The operation of the holder positioner 134 may be controlled by the controller 120. Optionally, the position of the fixture 130 may be fixed during operation of the other modules 114, 116, 118 when separating the wires 102. Alternatively, the position of the fixture 130 may be changed during operation of the other modules 114, 116, 118, such as to change the orientation of the wire bundle 104 relative to the gas nozzle module 114.

The gas nozzle module 114 includes a gas nozzle 140. The gas nozzle 140 directs gas flow toward the wire bundle 104 in the wire separating area 110. The gas nozzle 140 may direct gas flow through an orifice at a tip 142 of the gas nozzle 140. The direction of the gas flow may be controlled. The velocity of the gas flow may be controlled. The pressure of the gas flow may be controlled. In the illustrated embodiment, the gas nozzle 140 is oriented generally horizontally and is configured to direct gas flow in a generally horizontal direction across the wire bundle 104. Optionally, the gas nozzle 140 may be oriented generally perpendicular to the cable 106. Other orientations are possible in alternative embodiments.

In an exemplary embodiment, the gas nozzle module 114 includes a gas supply line 144 that supplies gas to the gas nozzle 140. The gas supply line 144 may be a tube. Any type of gas may be supplied to the gas nozzle 140, such as air, nitrogen, and the like. The gas supply may be regulated by the controller 120. For example, the pressure of the gas supplied to the gas nozzle 140 may be regulated by the controller 120.

The gas nozzle module 114 includes a nozzle positioner 146 that positions the gas nozzle 140 relative to the other components of the wire separating machine 100. Optionally, the nozzle positioner 146 is movable in three dimensions to move the gas nozzle 140 to a desired location, such as proximate to the wire separating area 110. The nozzle positioner 146 may allow rotational movement of the gas nozzle 140 around the wire separating area 110 and the wire bundle 104, such as to target a particular wire 102. The nozzle positioner 146 may be a Cartesian motion robot with a rotary axis. Other types of positioners may be used in other embodiments, such as a selective compliance assembly robot arm (SCARA) or other robotic motion system. Optionally, the nozzle positioner 146 may allow translational movement, angular movement and rotational movement.

The operation of the nozzle positioner 146 may be controlled by the controller 120. Optionally, the position of the gas nozzle 140 may be fixed during operation of the other modules 112, 116, 118 when separating the wires 102. Alternatively, the position of the gas nozzle 140 may be changed during operation of the other modules 112, 116, 118, such as to change the orientation of the wire bundle 104 relative to the gas nozzle module 114.

During operation, the gas flow from the gas nozzle 140 is directed toward the wire bundle 104. Individual wires 102 may be separated from the wire bundle 104. The gas flow is guided by the shape, geometry, placement of the orifice or orifices, placement of the gas nozzle 140 relative to the wire bundle 104 and the like to achieve displacement and separation of individual wires 102 from the wire bundle 104. Optionally, certain wires 102 may be targeted and separated by controlled operation of the gas nozzle module 114. The momentum transfer from the gas flow to the wire 102 causes the wire 102 to separate from the wire bundle 104.

The velocity or pressure of the gas flow can be controlled, such as by a gas regulation device, to target a wire 102 for separation from the wire bundle 104. For example, in an exemplary embodiment, the wire bundle 104 may include different types of wires 102 or wires 102 having different characteristics, such as different stiffness, different flexibility, different material type, different wire gage, and the like. Wires 102 that are less stiff, more flexible, and/or smaller may be separated more easily and at lower pressures or velocities than other wires 102 that may be more stiff, less flexible, and/or larger at size. By controlling the gas flow, the smaller wires may be targeted initially and separated from the wire bundle 104.

Optionally, the wire 102 that is furthest from the gas nozzle 140 may tend to be separated. Controlling the position of the gas nozzle 140 relative to the wire bundle 104 and/or controlling the orientation of the wire bundle 104 relative to the gas nozzle 140 may allow for targeted separation of a particular wire 102 from the wire bundle 104. The gas flow tends to bend one of the wires 102 away from the wire bundle 104. The wire 102 may be bent or angled relative to the cable axis 132 in the direction generally away from the gas nozzle 140. The wire 102 may be directed toward the wire gripper module 116 or the wire gripper module 116 may be moved to grab the separated wire 102.

The wire gripper module 116 includes a wire gripper 150. In an exemplar embodiment, the wire gripper 150 may include clamps or fingers that may be used to grasp the separated wire 102. The wire gripper 150 may then move the wire 102 to a predetermine location. The operation of the wire gripper 150 is controlled by the controller 120.

In an exemplary embodiment, the wire gripper module 116 includes a gripper positioner 152 that positions the wire gripper 150 relative to the other components of the wire separating machine 100. Optionally, the gripper positioner 152 is movable in three dimensions to move the wire gripper 150 to a desired location, such as into the wire separating area 110 to grasp a wire 102 or, once the wire 102 is grasped, to a desired location to position the wire 102 at a predetermined location. The gripper positioner 152 may allow translational movement, angular movement and rotational movement. The gripper positioner 152 may be a Cartesian motion robot with a rotary axis. Other types of positioners may be used in other embodiments, such as a selective compliance assembly robot arm (SCARA) or other robotic motion system. The operation of the gripper positioner 152 may be controlled by the controller 120.

The sensor module 118 includes a sensor 160 used to locate the wires 102. The sensor 160 is positioned proximate to the wire separating area 110. The sensor 160 may be positioned proximate to the wire gripper module 116. Optionally, the sensor 160 may be part of, or coupled to, the wire gripper module 116. The sensor 160 is used to identify particular wires 102. For example, the sensor 160 may identify characteristic of the wires 102, such as the layout, shape, positional data, color and the like, to identify the wires 102. Optionally, the sensor 160 may include a camera to identify characteristics of the wires 102.

In an exemplary embodiment, the sensor 160 is coupled to the controller 120. Data from the sensor 160 is transmitted into the controller 120, and processed by the controller 120 to control operation of the other modules, such as the cable holder module 112 the gas nozzle module 114 and the wire gripper module 116. For example, the sensor 160 may determine that a wire 102 has been separated from the wire bundle 104 and is positioned and ready for the wire gripper 150 to grasp the wire 102. The sensor 160 may identify the particular wire 102, such as based on a color of the wire. The controller 120 determines a proper location for the wire 102 and controls movement of the wire gripper 150 to position the wire 102 at a predetermine location. Other wires 102 are manipulated in a similar fashion to position each of the wires 102 in predetermined locations for further processing, such as to terminate the wires 102 to a circuit board.

Optionally, the sensor module 118 may include a sensor positioner 162 that positions the sensor 160 relative to the other components of the wire separating machine 100. The sensor 160 may be positioned to sense the location of the wires 102 and/or the wire gripper 150, such as to aid in separating the wires 102 and positioning the wires 102 in predetermined locations. The sensor may provide a feedback loop for ensuring proper operation of the wire separating machine 100. Optionally, the sensor positioner 162 is movable in three dimensions to move the sensor 160 to a desired location, such as proximate to the wire separating area 110. The sensor positioner 162 may allow translational movement, angular movement and rotational movement. The sensor positioner 162 may be a Cartesian motion robot with a rotary axis. Other types of positioners may be used in other embodiments, such as a selective compliance assembly robot arm (SCARA) or other robotic motion system. The operation of the sensor positioner 162 may be controlled by the controller 120.

Figure 2:
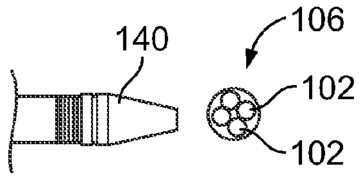
FIG. 2 illustrates an end view of a cable with a gas nozzle positioned adjacent the cable.

FIG. 2 illustrates an end view of the cable 106 with the gas nozzle 140 positioned adjacent the wire bundle 104. The cable 106 includes a plurality of the wires 102. In an exemplary embodiment, the wires 102 are different than one another. For example, some of the wires 102 may have a smaller diameter and some of the wires 102 may have a larger diameter. The smaller diameter wires 102 may be more flexible and less stiff than the larger wires. The larger diameter wires may be less flexible and stiffer than the smaller diameter wires. Optionally, more than two different diameter wires may be provided.

During operation, when the gas flow is directed across the wire bundle 104 the smaller diameter wires may tend to separate more easily and/or at lower pressure than the larger diameter wires. By varying the gas flow across the wire flow bundle 104 the smaller diameter wires 102 may be separated initially by using a lower velocity or lower pressure gas flow across the wire bundle 104. The lower pressure gas flow may be at a level that is too low to move the larger diameter wires, but high enough to cause the smaller diameter wires 102 to separate from the wire bundle 104. In this manner, the wires 102 may be selectively separated by targeting certain wires 102, such as the smaller diameter wire. The gas flow may later be adjusted to target the larger diameter wires, such as by increasing the pressure and velocity of the gas flow.

The wires 102 may have different characteristics that allow targeting of certain wires from the wire bundle 104. For example, some wires may be stranded wires while other wires are solid conductors. The stranded wires may be easier to separate from the wire bundle 104 than the solid conductors allowing separation of the stranded wires prior to the solid conductors.

Figure 3:
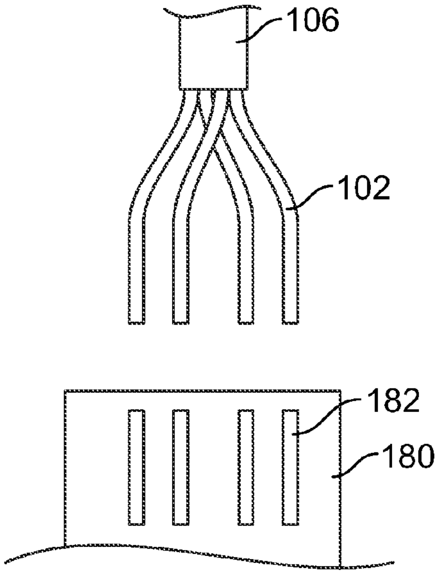
FIG. 3 illustrates the cable showing wires thereof in a separated state.

FIG. 3 illustrates the cable 106 showing the wires 102 in a separated state. The wires 102 may be oriented at predetermined positions relative to each other. For example, the wires 102 may be aligned in a single row and spaced apart from each other, such as for terminating to a circuit board 180. The circuit board 180 may have pads 182 at predetermine pitches. The wires 102 may be spaced apart to correspond to the spacing of the pads 182. The wires 102 may be soldered to the pads 182.

The wires 102 may be oriented differently in other applications. For example, the wires 102 may be positioned for termination to individual terminals. For example, the wires 102 may be positioned for setting into crimp barrels of individual terminals. The spacing of the wires 102 may be controlled based on the spacing of the terminals along the carrier strip. The wire gripper module 116 (shown in FIG. 1) controls the positioning of the wires 102 relative to each other depending on the particular application or end use for the cable 106.

Figure 4:
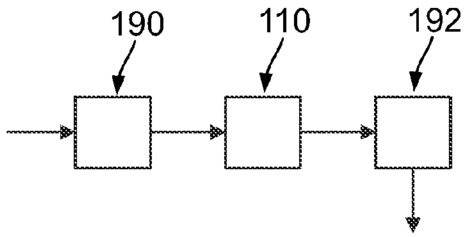
FIG. 4 illustrates a manufacturing process for manufacturing an electrical component using the wire separating machine.

FIG. 4 illustrates a manufacturing process for manufacturing an electrical component using the wire separating machine 100. The process uses a cable preparation machine 190, the wire separating machine 100 and a connector processing machine 192. At the cable preparation machine 190, the cable 106 (shown in FIG. 1) may be prepared, such as by cutting the cable to length and removing a portion of the jacket 108 (shown in FIG. 1) to expose the wire bundle 104 (shown in FIG. 1).

The prepared cables are then transferred to the wires separating machine 100. The wire separating machine 100 separates the individual wires 102 (shown in FIG. 1) from the wire bundle 104. The wire separating machine 100 positions the wires 102 at predetermine locations or positions relative to each other.

The cable 106, with the separated wires 102, is then transferred to the connector processing machine 192. At the connector processing machine 192, the cable 106 is terminated to an electrical connector to form the electrical component. For example, the wires 102 of the cable 106 may be soldered to a circuit board. The wires 102 of the cable 106 may be terminated to individual contacts or terminals to the wires 102. The wires 102 may be terminated to other components in alternative embodiments. For example, the wires 102 may be terminated to leads of a lead frame.

Figure 5:
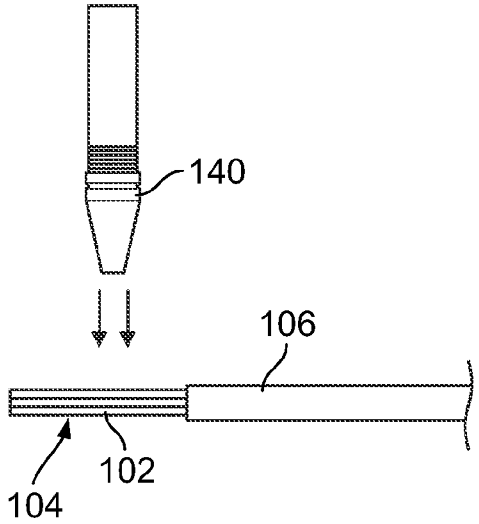
FIG. 5 illustrates the gas nozzle and the cable in another orientation.

FIG. 5 illustrates the gas nozzle 140 and the cable 106 in another orientation. The gas nozzle 140 is oriented vertically and is directing gas flow downward toward the wire bundle 104. The cable 106 is oriented horizontally and the wire bundle 104 is positioned below the gas nozzle 140. The wires 102 are bent downward by the gas flow in the direction of gravity, which may make it easier to separate the wires 102.

Figure 6:
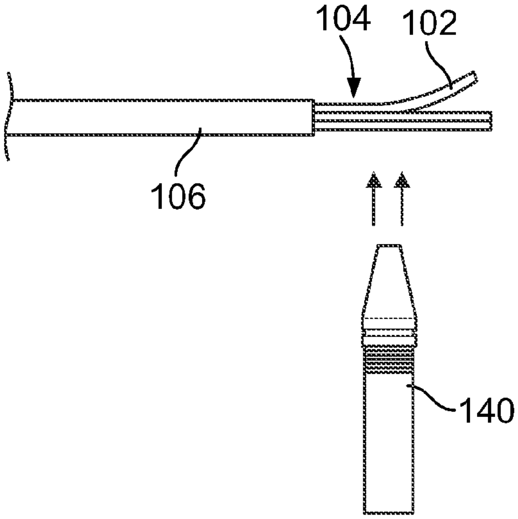
FIG. 6 illustrates the gas nozzle and the cable in another orientation.

FIG. 6 illustrates the gas nozzle 140 and the cable 106 in another orientation. The gas nozzle 140 is oriented vertically and is directing gas flow upward toward the wire bundle 104. The cable 106 is oriented horizontally and the wire bundle 104 is positioned above the gas nozzle 140. The wires 102 are bent upward by the gas flow against gravity, which may make it easier to separate the wires 102.

Figure 7:
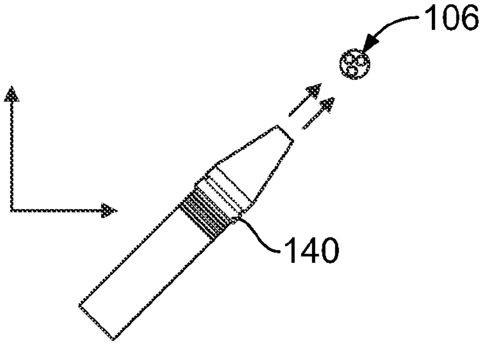
FIG. 7 illustrates the gas nozzle and the cable in another orientation.

FIG. 7 illustrates the gas nozzle 140 and the cable 106 in another orientation. The gas nozzle 140 is oriented at an angle toward the cable 106. The gas nozzle 140 is oriented neither vertically nor horizontally.

Figure 8:
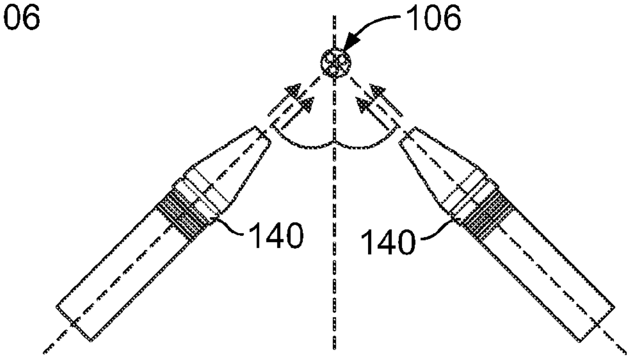
FIG. 8 illustrates a pair of gas nozzles directing gas flow at the cable.

FIG. 8 illustrates a pair of gas nozzles 140 that direct gas flow at the cable 106. The first and second gas nozzles 140 are angled in different directions to direct the gas flow in different directions toward the cable 106. Optionally, more than two gas nozzles 140 may be provided. Optionally, the gas nozzles 140 may be operated differently, such as by outputting gas at different velocities, by outputting different gases. Optionally, the gas nozzles 140 may be positioned at different distances from the cable 106.

Figure 9:
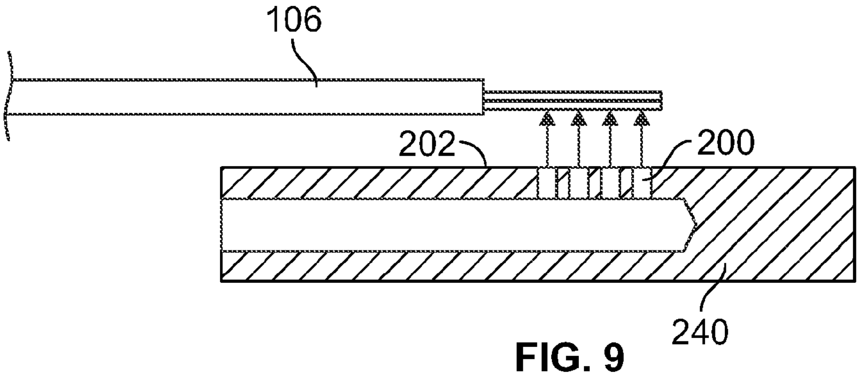
FIG. 9 illustrates a gas nozzle and the cable in another orientation.

FIG. 9 illustrates a gas nozzle 240 and the cable 106 in another orientation. Both the gas nozzle 240 and cable 106 are oriented horizontally. The gas nozzle 240 is oriented parallel to the cable 106. The gas nozzle 240 includes a plurality of orifices 200 through a side 202 of the gas nozzle 240, as opposed to an orifice at the tip of the gas nozzle 240. The gas nozzle 240 may include any number of orifices 200. The orifices 200 may direct the gas flow in a single direction or alternatively, the orifices may be angled to direct the gas flow in multiple directions. The orifices 200 may be aligned in a single row or alternatively may be radially offset from one another. In the illustrated embodiment, the gas nozzle 240 directs the gas flow in an upward direction toward the cable 106. Other orientations are possible in alternative embodiments.

Figure 10:
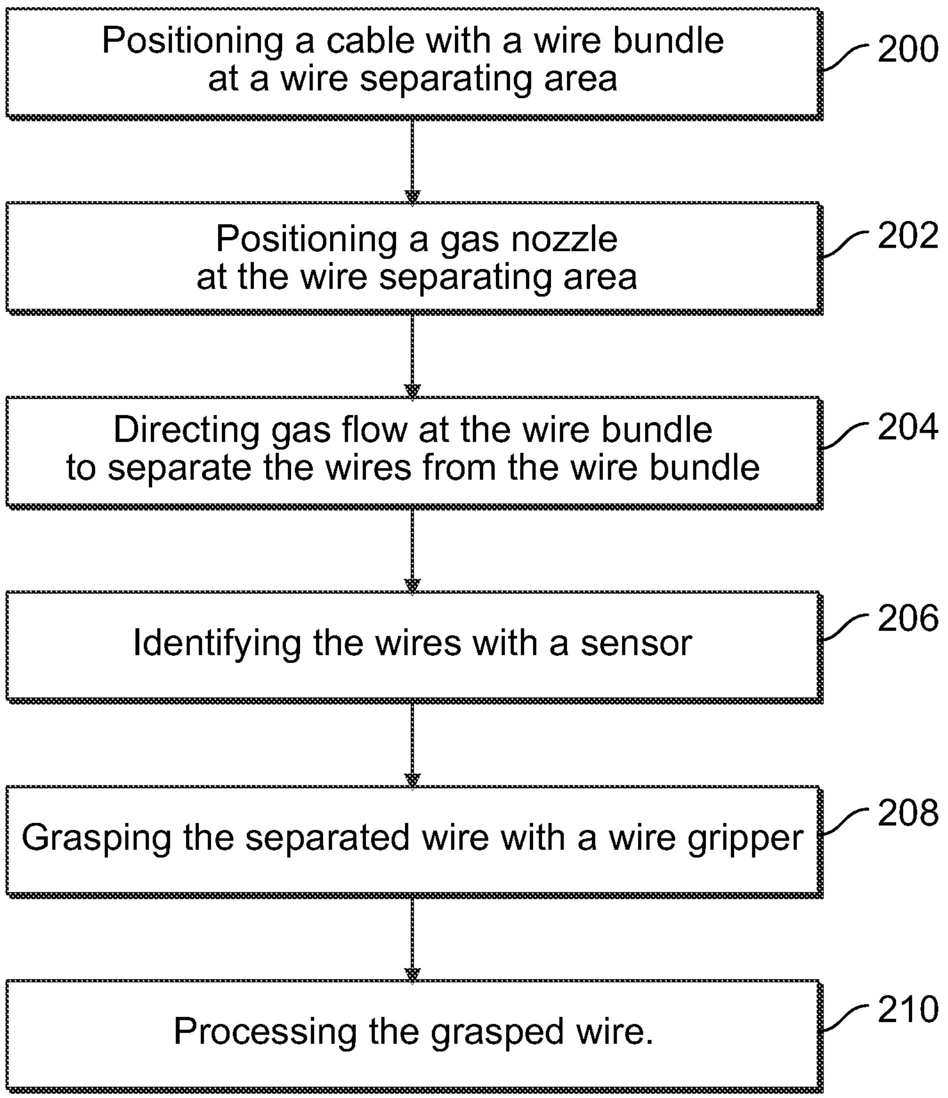
FIG. 10 illustrates a method of separating wires from a wire bundle.

FIG. 10 illustrates a method of separating wires from a wire bundle. The method may be performed by an automated process without the need for human intervention. The method includes positioning 200 a cable with a wire bundle at a wire separating area. The cable and wire bundle may be positioned by a cable holder. The cable may be held with a fixture upstream of the wire separating area. The cable may be fixed in position at the wire separating area. Optionally, the cable holder may move the cable into position and may move the cable during processing to aid in separating the wires. For example, the cable may be rotated to change the relative positions of the wires, such as to target specific wires for separation.

The method includes positioning 202 a gas nozzle at the wire separating area. The method includes directing 204 gas flow at the wire bundle to separate the wires from the wire bundle. The gas nozzle may be positioned in close proximity to the wire bundle to direct gas at the wire bundle to separate individual wires from the wire bundle. The gas nozzle may be positioned by a nozzle positioner. The position of the gas nozzle may be changed relative to the wire bundle, such as to target certain wires. Optionally, the pressure of the gas flow may be controlled and varied during processing. For example, at lower pressures smaller wires in the wire bundle may be separated from larger wires in the wire bundle. The gas flow may be steady or may be supplied in bursts to facilitate separating the wires. The gas flow impinges on the wires and causes the wires to bend away from the gas nozzle. Optionally, one wire at a time may be separated.

The method includes identifying 206 the wires with a sensor. For example, the sensor may include a camera that is used to identify the positions of the wires. The sensor may identify a specific wire, such as based on a color of the wire or other wire attributes. By identifying the wires, the controller is able to determine a desired location for the wire, such as for attachment to a circuit board.

The method includes grasping 208 the separated wire with a wire gripper and processing 210 the grasped wire. The wire gripper may include fingers or clamps that are able to grasp and manipulate the wire. The controller controls the operation of the wire gripper. The controller may cause the wire gripper to position the wire at a predetermined location. For example, based on the wire identification, the controller is able to cause the wire gripper to move the wire to a certain position relative to the other wires, such as for attachment to a circuit board. The grasped wire may be processed by moving the wire to a particular location. The wire may be processed by soldering the wire to a circuit board. The wire may be processed by crimping a terminal to the wire. The wire may be processed by removing insulation from around the conductor of the wire. The wire may be processed by cleaning and/or coating the wire.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A wire separating system comprising:

a cable holder having a fixture holding a cable with a wire bundle of signal wires extending into a wire separating area;

a gas nozzle at the wire separating area, the gas nozzle directing gas flow into the wire separating area at the wire bundle, the gas flow separating individual signal wires from the wire bundle; and a wire gripper at the wire separating area, the wire gripper grasping the separated signal wire from the wire bundle.

2. The wire separating system of claim 1, wherein the gas nozzle is configured to vary at least one of a pressure of the gas flow and a velocity of the gas flow.

3. The wire separating system of claim 1, wherein the wire bundle includes wires of different stiffness, the gas nozzle varying the pressure of the gas flow to initially separate the wire of less stiffness from the wire of greater stiffness.

4. The wire separating system of claim 1, wherein the wire gripper moves the grasped wire from the wire separating area.

5. The wire separating system of claim 1, further comprising a sensor configured to identify the separated wire.

6. The wire separating system of claim 1, further comprising a sensor configured to identify the wires based on a color of the wires.

7. The wire separating system of claim 1, further comprising a second gas nozzle directing gas flow into the wire separating area in a direction different than the other gas flow.

8. The wire separating system of claim 1, wherein the relative position of the gas nozzle with respect to the wire bundle is changed to change the direction of the gas flow relative to the wire bundle.

9. A wire separating system comprising:

a cable holder having a fixture holding a cable with a wire bundle, free ends of wires of the wire bundle extending into a wire separating area;

a gas nozzle at the wire separating area, the gas nozzle directing gas flow into the wire separating area at the free ends of the wires, the gas flow separating individual wires from the wire bundle; and a wire gripper at the wire separating area, the wire gripper grasping the free end of the separated wire from the wire bundle and moving the free end to a designated termination location.

10. The wire separating system of claim 9, wherein the gas nozzle is configured to vary at least one of a pressure of the gas flow and a velocity of the gas flow.

11. The wire separating system of claim 9, wherein the wire bundle includes wires of different stiffness, the gas nozzle varying the pressure of the gas flow to initially separate the wire of less stiffness from the wire of greater stiffness.

12. The wire separating system of claim 9, further comprising a sensor configured to identify the separated wire.

13. The wire separating system of claim 9, further comprising a sensor configured to identify the wires based on a color of the wires.

14. A wire separating system comprising:

a cable holder having a fixture holding a cable with a wire bundle extending into a wire separating area;

a sensor at the wire separating area, the sensor sending output signals to a controller being configured to identify locations of individual wires of the wire bundle;

a gas nozzle at the wire separating area, the gas nozzle being operably coupled to the controller, the gas nozzle directing gas flow into the wire separating area at the wire bundle, the gas flow separating individual wires from the wire bundle, a position of the gas nozzle relative to the wire bundle being changeable and controlled by the controller based on the identified location of the wires of the wire bundle to target separating a select individual wire from the wire bundle; and a wire gripper at the wire separating area, the wire gripper grasping the separated wire from the wire bundle.

15. The wire separating system of claim 14, wherein the gas nozzle is configured to vary at least one of a pressure of the gas flow and a velocity of the gas flow.

16. The wire separating system of claim 14, wherein the wire bundle includes wires of different stiffness, the gas nozzle varying the pressure of the gas flow to initially separate the wire of less stiffness from the wire of greater stiffness.

17. The wire separating system of claim 14, wherein the wire gripper moves the grasped wire from the wire separating area.

18. The wire separating system of claim 14, wherein the sensor is configured to identify the wires based on a color of the wires.

19. The wire separating system of claim 14, further comprising a second gas nozzle directing gas flow into the wire separating area in a direction different than the other gas flow.

20. The wire separating system of claim 14, wherein the relative position of the gas nozzle with respect to the wire bundle is changed to change the direction of the gas flow relative to the wire bundle.

* * * * *